United States Patent [19]

Tamura et al.

[11] 3,860,640

[45] Jan. 14, 1975

[54] 3-ALKOXY-5-SUBSTITUTED PHENYLACETIC ACIDS

[75] Inventors: Yasumitsu Tamura, Takarazuka; Masao Murayama; Eisuke Seto, both of Kyoto; Yoshihiko Yoshimoto, Shiga; Hisayuki Wada, Kyoto, all of Japan

[73] Assignee: Nippon Shinyaku Co., Ltd., Kyoto, Japan

[22] Filed: Mar. 23, 1973

[21] Appl. No.: 344,098

[30] Foreign Application Priority Data
Apr. 12, 1972  Japan.............................. 47-36774
Apr. 12, 1972  Japan.............................. 47-36775

[52] U.S. Cl....... 260/520, 260/332.2 A, 260/521 R, 424/275, 424/317
[51] Int. Cl...................... C07d 63/54, A61k 27/00
[58] Field of Search......... 260/332.2 A, 520, 521 R, 260/521 A

[56] References Cited
UNITED STATES PATENTS

| | | | |
|---|---|---|---|
| 2,567,873 | 9/1951 | Burtner............................ | 260/520 |
| 2,921,939 | 1/1960 | Ramsden ......................... | 260/295 |
| 3,452,079 | 6/1969 | Shen et al......................... | 260/469 |
| 3,558,641 | 1/1971 | Sarett et al. ....................... | 260/295 |
| 3,671,580 | 6/1972 | Shen et al......................... | 260/520 |
| 3,678,104 | 7/1972 | Vesely et al. ..................... | 260/521 |
| 3,692,821 | 9/1972 | Sarett et al. ...................... | 260/473 |

*Primary Examiner*—Henry R. Jiles
*Assistant Examiner*—C. M. S. Jaisle

[57] ABSTRACT

A series of 3-alkoxy-5-substituted phenylacetic acids, new and useful as antiinflammatory and analgesic drugs, was prepared either by a hydrolysis of the corresponding alkyl esters or nitriles or by a reduction of the corresponding halogeno-substituted compounds.

10 Claims, No Drawings

3-ALKOXY-5-SUBSTITUTED PHENYLACETIC ACIDS

This invention relates to 3-alkoxy-5-substituted phenylacetic acid expressed by the following general formula

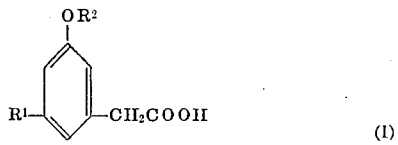

wherein $R^1$ stands for a lower alkyl group, a cycloalkyl group, a thienyl group, a non-substituted phenyl group or a phenyl group substituted by a halogen atom, a lower alkoxy group or a lower alkyl group; and $R^2$ stands for a lower alkyl group.

Compounds expressed by the above general formula (I) are novel compounds that have not been described in literature references, and they have excellent antiinflammatory and analgesic activities and are useful as medicines. Instances of pharmacological activities of these compounds are shown in Table 1.

TABLE 1

| $R^1$ | $R^2$ | Inhibition of Carrageenin Edema,% mg/Kg (p.o.), % | | Analgesic Activity (modified Haffner's method) $ED_{50}$, mg/Kg(i.p.) | $LD_{50}$ mg/Kg(i.p.) | Lowering of Cholesterol Level in Blood, % |
|---|---|---|---|---|---|---|
| phenyl | methyl | 100 | 59 | 100 | 600 | — |
|  |  | 50 | 35 |  |  |  |
| p-chloro- | methyl | 100 | 65 | 180 | 300 | — |
| phenyl |  | 50 | 57 |  |  |  |
| bromo-p- | methyl | 100 | 55 | 195 | 252 | — |
| methoxy- |  |  |  |  |  |  |
| phenyl |  | 50 | 43 |  |  |  |
| methyl | methyl | — | — | — | — | 30.7 |
| 2-thienyl | methyl | 100 | 60 | 100 | 550 | — |
| Phenylbutazone (Control) |  | 100 | 55 | 150 | 420 | — |
| Ibufenac (Control) |  | 200 | 34 | >400 | 1130(s.c.) | — |

Compounds (I) of this invention may be prepared by various methods. One of the preferred methods is a hydrolysis of the corresponding alkyl esters or of the corresponding nitriles. Namely, the first method for the manufacture of (I) comprises hydrolyzing a compound expressed by the following general formula

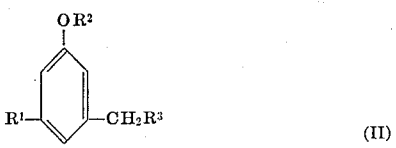

wherein $R^1$ and $R^2$ are as defined above, and $R^3$ stands for an alkoxycarbonyl or cyano group.

It is desired that in the practice of the process of this method, the reaction is carried out in the presence of methanol and sodium hydroxide or in the presence of acetic acid and sulfuric acid.

Another preferred method is a reduction of the corresponding halogeno-substituted compounds. Namely, the second method for the manufacture of (I) comprises reducing a compound expressed by the following general formula

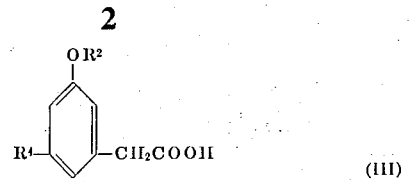

wherein $R^4$ stands for a halogen-substituted alkoxyphenyl or a halogen-substituted thienyl group and $R^2$ is as defined above. In this second method, the reduction can be accomplished by various reduction methods and it is preferable to adopt catalytic reduction methods, especially a catalytic reduction method using palladium-carbon.

This invention will now be illustrated in more detail by the following non-limitative examples. Examples 1 to 10 relates to the first or the hydrolysis method and examples 11 to 12 relates to the second or the reduction method.

EXAMPLE 1

This Example illustrates a process for preparing 3-methoxy-5-(phenyl)-phenyl acetic acid of the following formula:

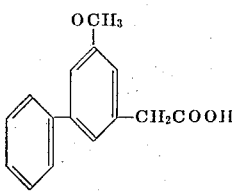

a. A solution of 9.2g of sodium hydroxide dissolved in 120 ml of water was added to 56.4g of methyl 3-methoxy-5-(phenyl-phenyl-acetate, and 120 ml of methanol was further added to the mixture. Then, the mixture was heated to form a homogeneous solution. After the heating was conducted for 30 minutes to hour, methanol was distilled off, and the remaining aqueous solution was washed with ether and made acidic by addition of dilute hydrochloric acid. Precipitated crystals were recovered by filtration, washed with water, dried and recrystallized from ethanol and water to obtain 37g of 3-methoxy-5-(phenyl)-phenyl-acetic acid melting at 141° – 143°C. Further recrystallization gave crystals melting at 143° – 144°C.

Analysis values ($C_{15}H_{14}O_3$):

| Calculated: | C=74.36 %, H=5.83 % |
|---|---|
| Found: | C=74.65 %, H=5.69 % | b. 4.5 ml Of a mixture containing concentrated sulfuric acid, acetic acid and water in equal amounts was added to 1.4g of 3-methoxy-5-(phenyl)-phenyl acetonitrile, and the mixture was heated at 90°C for 12 hours on an oil bath under agitation. Precipitated crystals were recovered by filtration, washed with water, dried and recrystallized from ethanol and water to obtain 0.7g of 3-methoxy-5-(phenyl)-phenyl-acetic acid melting at 143° – 144°C.

EXAMPLE 2

This Example illustrates a process for preparing 3-methoxy-5-isopropylphenyl-acetic acid of the following formula:

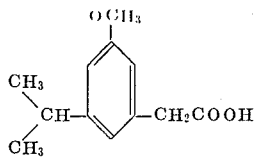

A solution of 1.05g of sodium hydroxide dissolved in 20 ml of water was added to 5.3g of methyl 3-methoxy-5-isopropylphenyl-acetate, and 20 ml of methanol was further added, following which the mixture was heated to form a homogeneous solution.

After 30 minutes to 1 hour, methanol was distilled off, and the remaining aqueous solution was washed with ether and made acidic by addition of dilute hydrochloric acid. A precipitated oily substance was extracted with ether.

The ether extract was washed with water and dried, and ether was distilled off. The residue was distilled under reduced pressure to obtain 2.7g of 3-methoxy-5-isopropylphenyl-acetic acid having a boiling point of 150° – 152°C under 4 mm Hg (having a melting point of 40° – 43°C).

| Analysis values($C_{12}H_{16}O_3$): | |
|---|---|
| Calculated: | C=69.21 %, H=7.74 % |
| Found: | C=68.98 %, H=8.01 % |

By similar procedures, the following compounds were obtained.

EXAMPLES 3 to 10

Preparation of compounds of following formula:

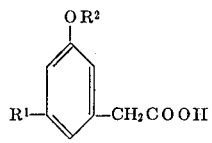

| Example No. | $R^1$ | $R^2$ | Boiling or Melting Point |
|---|---|---|---|
| 3 | methyl | n-butyl | m.p.: 60 – 61°C |
| 4 | methyl | isobutyl | m.p.: 98 – 99°C |
| 5 | cyclohexyl | methyl | b.p.: 186 – 190°C/3mm Hg (m.p.: 49 – 53°C) |
| 6 | o-chlorophenyl | methyl | b.p.: 210 – 213°C/1mm Hg |
| 7 | p-chlorophenyl | methyl | m.p.: 149 – 152°C |
| 8 | 2-thienyl | methyl | m.p.: 124 – 127°C |
| 9 | p-methoxyphenyl | methyl | m.p.: 142 – 144°C |
| 10 | p-tolyl | methyl | m.p.: 134 – 138°C |

EXAMPLE 11

This Example illustrates a process for preparing 3-methoxy-5-p-methoxyphenyl-phenyl-acetic acid of the following formula:

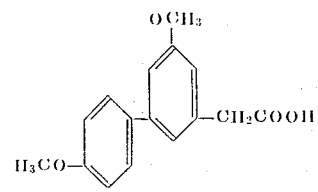

3.8g Of 3-methoxy-5-(p-methoxy-m- or o-bromo)-phenyl-phenyl-acetic acid was dissolved in 200 ml of acetic acid and 1.0g of sodium acetate was added to the solution. The catalytic reduction was carried out at room temperature under atomospheric pressure in the presence of a palladium-carbon catalyst to obtain 2.8g of 3-methoxy-5-p-methoxyphenyl-phenyl-acetic acid melting at 142° – 144°C.

Analysis Values ($C_{16}H_{16}O_4$):
   Calculated: C=70.57%, H=5.92%
   Found: C=70.50%, H=5.87%

The following compound could be synthesized in the same manner as described above.

| Example No. | $R^1$ | $R^2$ | Melting Point |
|---|---|---|---|
| 12. | 2-thienyl | methyl | 124 – 127°C |

What is claimed is:
1. A compound of the formula

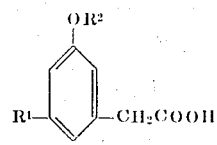

wherein $R^1$ is phenyl or phenyl substituted by halogen, lower alkoxy or lower alkyl and $R^2$ is lower alkyl.

2. The compound of claim 1, wherein $R^1$ is halophenyl.

3. The compound of claim 2, wherein $R^1$ is chlorophenyl.

4. The compound of claim 3, wherein $R^1$ is p-chlorophenyl.

5. The compound of claim 1 in which $R^1$ is phenyl and $R^2$ is methyl.

6. The compound of claim 1 in which $R^1$ is p-chlorophenyl and $R^2$ is methyl.

7. The compound of claim 1 in which $R^1$ is isopropylphenyl and $R^2$ is methyl.

8. The compound of claim 1 in which $R^1$ is o-chlorophenyl and $R^2$ is methyl.

9. The compound of claim 1 in which $R^1$ is p-methoxyphenyl and $R^2$ is methyl.

10. The compound of claim 1 in which $R^1$ is p-tolyl and $R^2$ is methyl.

* * * * *